(12) United States Patent
Sendfeld et al.

(10) Patent No.: US 6,402,102 B1
(45) Date of Patent: Jun. 11, 2002

(54) ADJUSTABLE LENGTH COLUMN FOR CHAIRS AND TABLES AND LENGTH ADJUSTING ELEMENT THEREFOR

(75) Inventors: Norbert Sendfeld, Gerolsbach; Günter Ströber, Creussen, both of (DE)

(73) Assignee: Suspa Holding GmbH, Altdorf (DE)

( * ) Notice: Subject to any disclaimer, the term of this patent is extended or adjusted under 35 U.S.C. 154(b) by 0 days.

(21) Appl. No.: 09/527,292

(22) Filed: Mar. 17, 2000

(30) Foreign Application Priority Data

Mar. 18, 1999 (DE) .................................. 299 04 980 U

(51) Int. Cl.⁷ .............................................. F16M 11/00
(52) U.S. Cl. ...................................... 248/161; 248/157
(58) Field of Search .............................. 248/161, 404, 248/157; 297/345; 72/53

(56) References Cited

U.S. PATENT DOCUMENTS

| | | | |
|---|---|---|---|
| 3,711,054 A | | 1/1973 | Bauer |
| 4,627,602 A | * | 12/1986 | Sporck .................. 248/161 X |
| 4,969,619 A | | 11/1990 | Bauer et al. |
| 4,979,817 A | | 12/1990 | Crisp, Sr. |
| 5,321,966 A | | 6/1994 | Backhaus |
| 5,816,088 A | | 10/1998 | Yamada et al. |
| 5,944,290 A | * | 8/1999 | Fuhrmann et al. .......... 248/161 |
| 5,992,815 A | * | 11/1999 | Metzdorf et al. ....... 248/161 X |

FOREIGN PATENT DOCUMENTS

EP          0 274 284          6/1988

* cited by examiner

*Primary Examiner*—Ramon O. Ramirez
(74) *Attorney, Agent, or Firm*—Browdy and Niemark

(57) ABSTRACT

An adjustable length column for chairs and tables comprises an upright tube and a pneumatic or hydropneumatic length adjusting element, which is disposed therein concentrically of a common central longitudinal axis. The housing of the element has an outer surface, which is guided for displacement in the direction of the axis and radially supported in a guide bush which is disposed in the upright tube. The outer surface of the housing is unpolished, shot peened and has a browned layer.

2 Claims, 1 Drawing Sheet

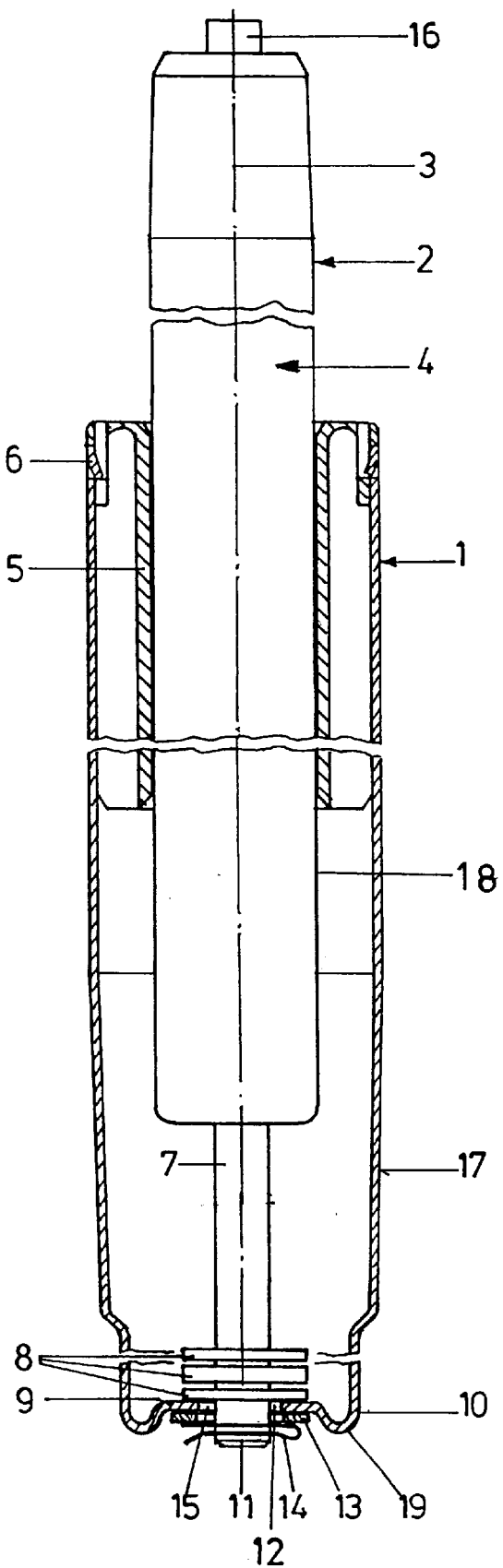

ADJUSTABLE LENGTH COLUMN FOR CHAIRS AND TABLES AND LENGTH ADJUSTING ELEMENT THEREFOR

BACKGROUND OF THE INVENTION

1. Field of the Invention

The invention relates to an adjustable length column for chairs and tables, comprising an upright tube and a pneumatic or hydropneumatic length adjusting element, which is disposed therein concentrically of a common central longitudinal axis, and the housing of which has an outer surface, which is guided for displacement in the direction of the axis and radially supported in a guide bush which is disposed in the upright tube.

2. Background Art

Adjustable length columns of the generic type are known from U.S. Pat. No. 4,969,619. In these adjustable length columns and the length adjusting elements employed therein, which are regularly adjustable length gas springs, the surface, i.e. the outside wall of the housing of the length adjusting element, is polished and then chromium plated or browned, polishing being necessary for impeccable guidance in the guide bush of the upright tube to be ensured. In particular, the surface roughness of the outside wall of the housing must be very low so that in the guide bush, which regularly consists of plastic material, no unnecessary wear will occur, as a result of which the radial zero backlash would be lost. In particular with browned surfaces, it has been found that the browning is affected in the course of time by the friction in the guide bush.

SUMMARY OF THE INVENTION

It is an object of the invention to embody an adjustable length column of the generic type and a length adjusting element therefor of the generic type such that the lifetime of the browning of the surface of the outside wall of the length adjusting element is increased.

According to the invention, this object is achieved in an adjustable length column of the generic type by the outer surface of the housing being unpolished, shot peened and having a browned layer. Furthermore, this object is achieved by a length adjusting element for such a column.

The design of the length adjusting element according to the invention not only helps attain that the expensive polishing of the surface of the outside wall of the housing is replaced by less complicated shot peening, but it also ensures that the browning applied after shot peening will be more durable. The reason may reside in that the surface obtains an extremely finely grained structure by the browning, only the upper edges of the minute depressions produced by shot peening taking their beating on the guide bush and the browning being rubbed off only there in the course of time, whereas it is maintained in the depressions. Thus, it is optically maintained for a prolonged time.

When shot peening is carried out with special intensity, then ribs may form on the edges of the grains, these ribs being slightly too marked. In these cases, it can be of advantage that the surface is burnished on the browned layer, i.e. these ribs are slightly smoothed by means of so-called burnishing rollers, which are guided under pressure along the surface.

BRIEF DESCRIPTION OF THE DRAWING

Details of the invention will become apparent from the ensuing description of an exemplary embodiment, taken in conjunction with the drawing, which is an illustration, partially broken away, of an adjustable length column according to the invention.

DESCRIPTION OF THE PREFERRED EMBODIMENT

The chair column seen in the drawing comprises an upright tube 1, in which an adjustable length gas spring 2 is disposed as a pneumatic or hydropneumatic piston-cylinder adjusting element. The upright tube 1 and the gas spring 2 have a common central longitudinal axis 3.

An external housing 4 of the gas spring 2 is supported in a guide bush 5 of suitable plastic material in a manner radially substantially free from play and axially displaceably in the direction of the axis 3; the guide bush 5 is disposed on an end 6 of the upright tube 1, which is the upper end in the drawing. This external housing 4 of the gas spring 2 may be the housing of the gas spring itself or a protecting tube which surrounds the latter externally.

Protruding from the housing 4 of the gas spring 2 is a piston rod 7, which is supported in the direction of the axis 3 relative to a bottom 9 of the upright tube 1 via an axial roller bearing 8. The bottom 9 is located at the other end 10 of the upright tube 1, which is opposite the end 6 and which is the lower end in the drawing. A protrusion. 11 of the piston rod 7, which passes through the axial roller bearing 8, reaches through an opening 12, embodied concentrically with the axis 3, in the bottom 9. Toward the underside of the bottom 9, a shim 13 and a spring securing ring 14 protect the protrusion 11 from being pulled out. The diameter of the opening 12 exceeds the diameter of the protrusion 11. As a result of this type of fastening, the gas spring 2 is rotatable relative to the upright tube 1. Due to the radial clearance 15 between the protrusion 11 and the opening 12, the gas spring 2 is inclinable to some minor degree relative to the upright tube 1, i.e. it is guided free from jamming in the guide bush 5. It is fixed by its piston rod 7 in the direction of the axis 3 relative to the upright tube 1 so that in the case of lengthwise adjustments of the gas spring 2 by operation of the actuating pin 16, the housing 4 of the gas spring 2 is extracted from the upright tube 1 or retracted into it. The actuating pin 16 is on the end, opposite the piston rod 7, of the housing 4 of the gas spring 2. This is also where a chair seat or a table top is fixed.

In the neighborhood of the end 10, the upright tube 1 has a cone section 17 which tapers slightly conically towards the end 10 and by means of which it is possible to fasten the upright tube 1 in a corresponding conical bush of a multi-legged chair base or the like.

As far as described hereinabove, the column, which serves primarily as a chair column, but also as a column for tables or the like, is generally known, commercial and described and illustrated in U.S. Pat. No. 3,711,054 and U.S. Pat. No. 4,979,718 or U.S. Pat. No. 4,969,619.

The surface 18 of the housing 4 is treated by shot peening instead of polishing, whereby the surface is rendered smooth and compact. The surface has a surface grain in the range of $\mu$m which cannot be seen in the drawing. After shot peening, the surface 18 has been browned so that the browned layer (not seen in the drawing) is applied to the shot peened surface 18. After application of the browned layer, the surface 18 may still be burnished.

Motions between the browned surface 18 and the guide bush 5 will occasion contact only between the edges of the mentioned surface grain and the guide bush 5; the browning can be rubbed off only in this area.

What is claimed is:

1. An adjustable length column for chairs and tables, comprising an upright tube (1) and a pneumatic or hydropneumatic length adjusting element, which is disposed therein concentrically of a common central longitudinal axis (3), and has a housing (4) with an outer surface (18), which housing (4) is guided for displacement in the direction of the axis (3) and radially supported in a guide bush (5) which is disposed in the upright tube, wherein the outer surface (18) of the housing (4) is unpolished, shot peened, has a browned layer and is burnished on the browned layer.

2. A pneumatic or hydropneumatic length adjusting element for an adjustable length column with an upright tube (1) for chairs and tables, in which column the pneumatic or hydropneumatic length adjusting element, by an outer surface (18) of a housing (4), is radially supported and displaceably guided in the direction of an axis (3) in a guide bush (5) which is disposed in the upright tube (1), wherein the outer surface (18) of the housing (4) is unpolished, shot peened, has a browned layer and is burnished on the browned layer.

* * * * *